G. B. ROBBINS & W. E. SHARP.
COMBINATION REFRIGERATOR, HEATER, AND VENTILATOR CAR.
APPLICATION FILED JULY 31, 1909.
1,013,517.
Patented Jan. 2, 1912
5 SHEETS—SHEET 1.
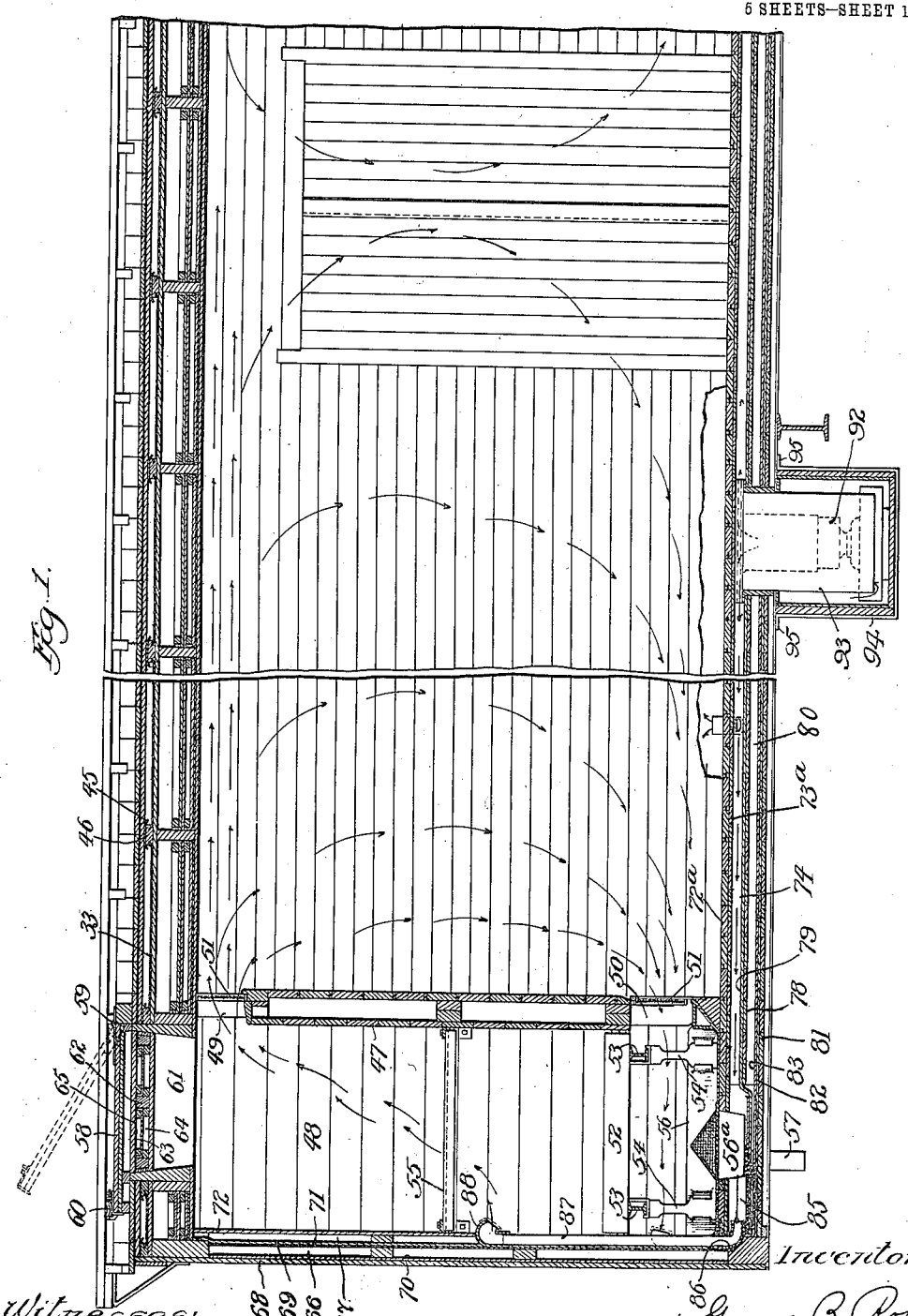

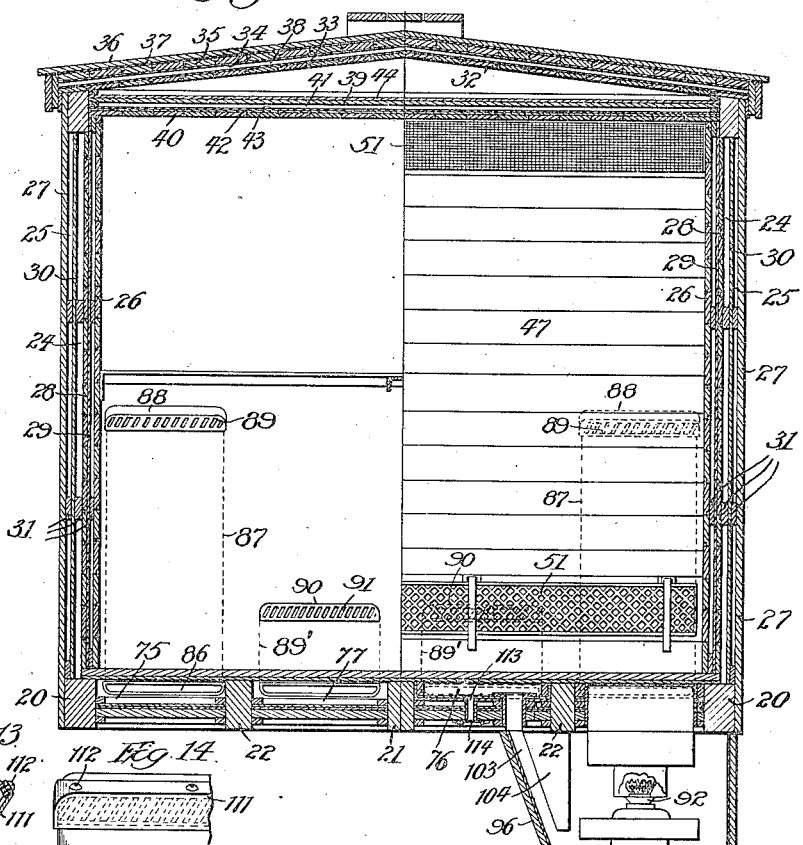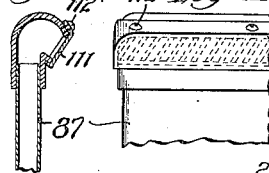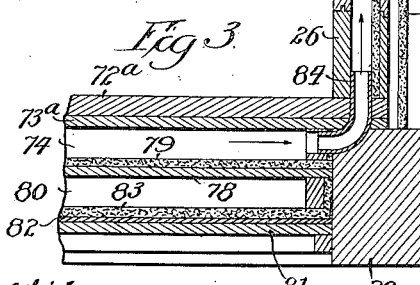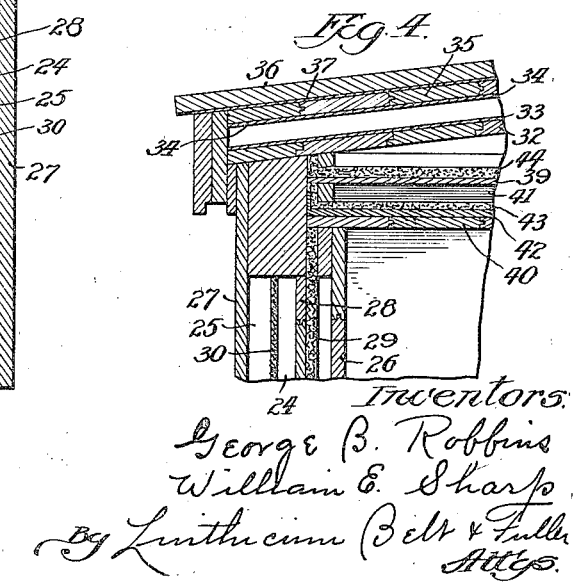

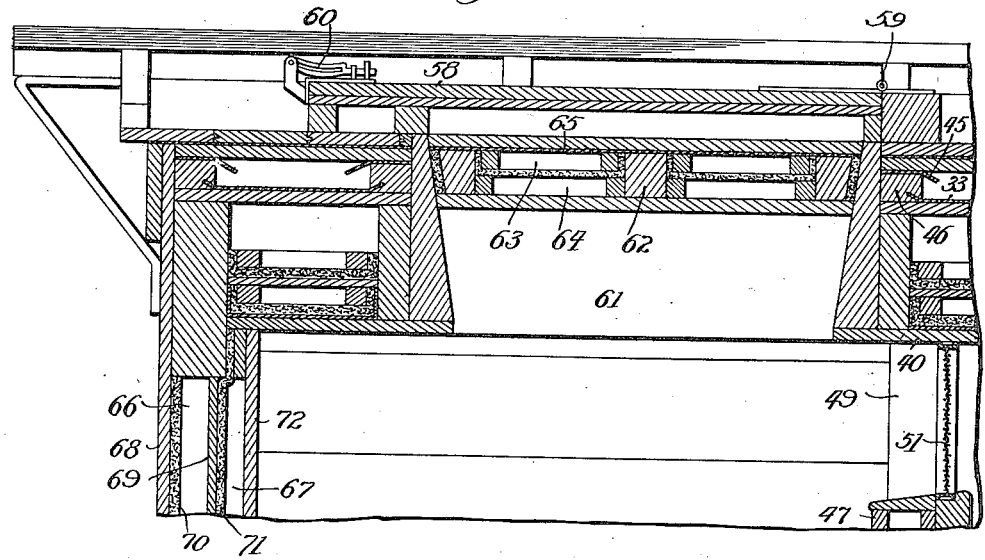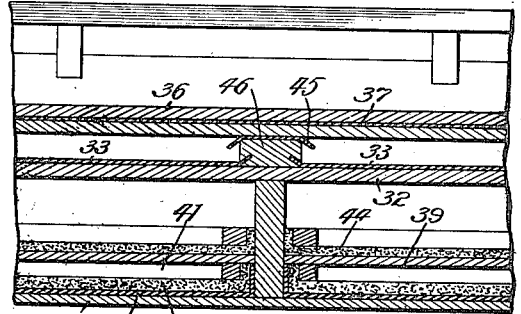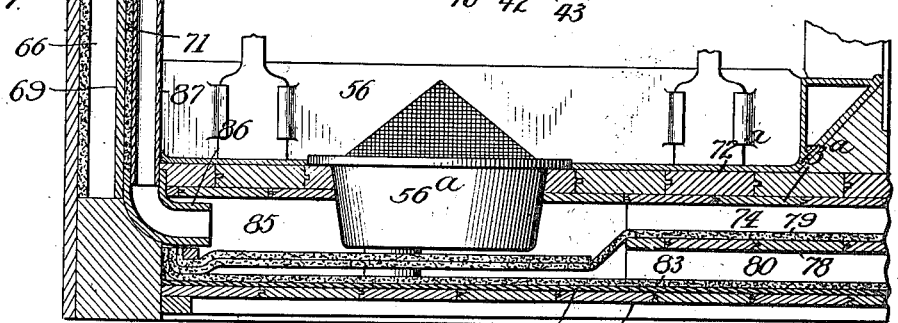

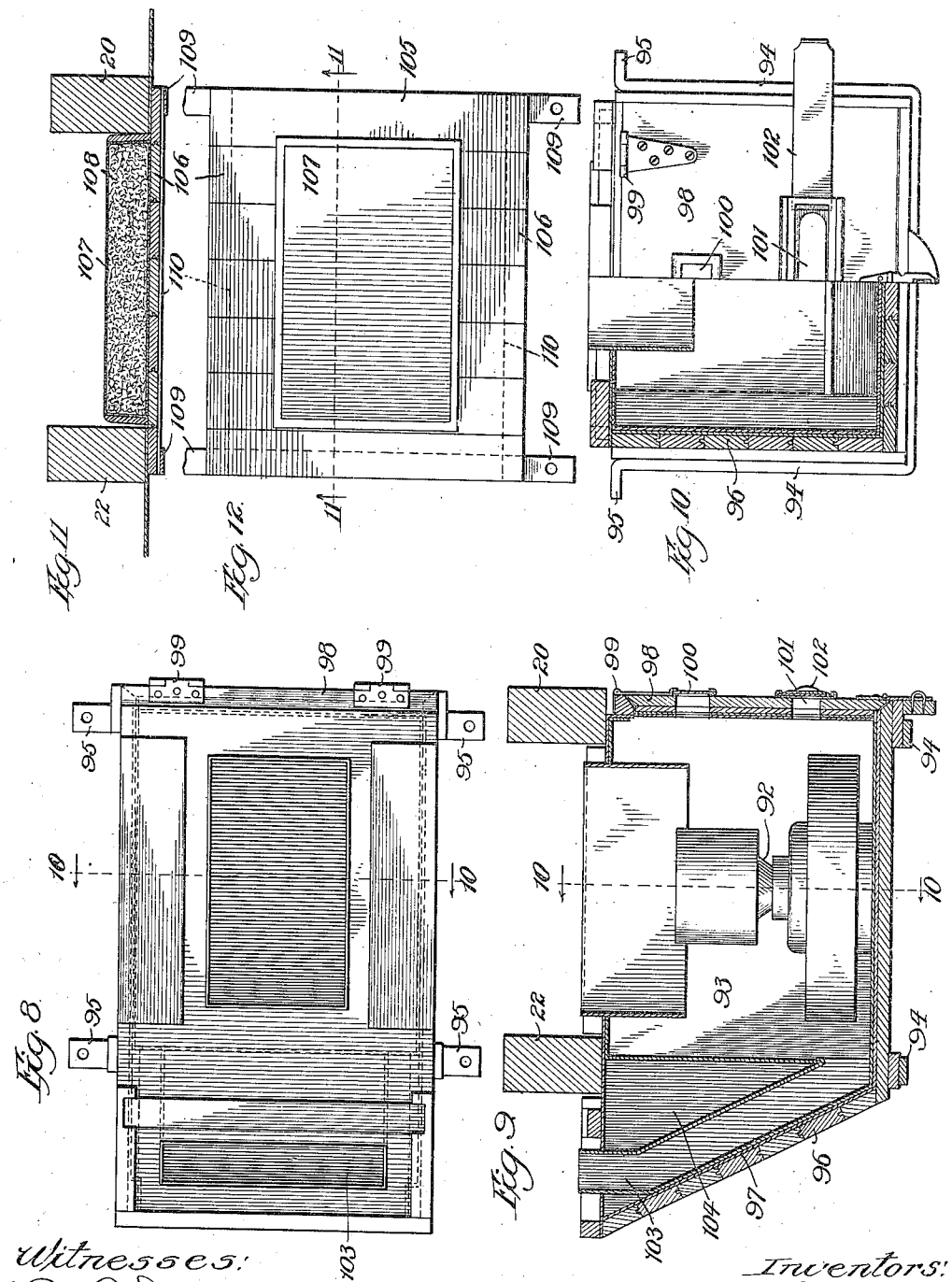

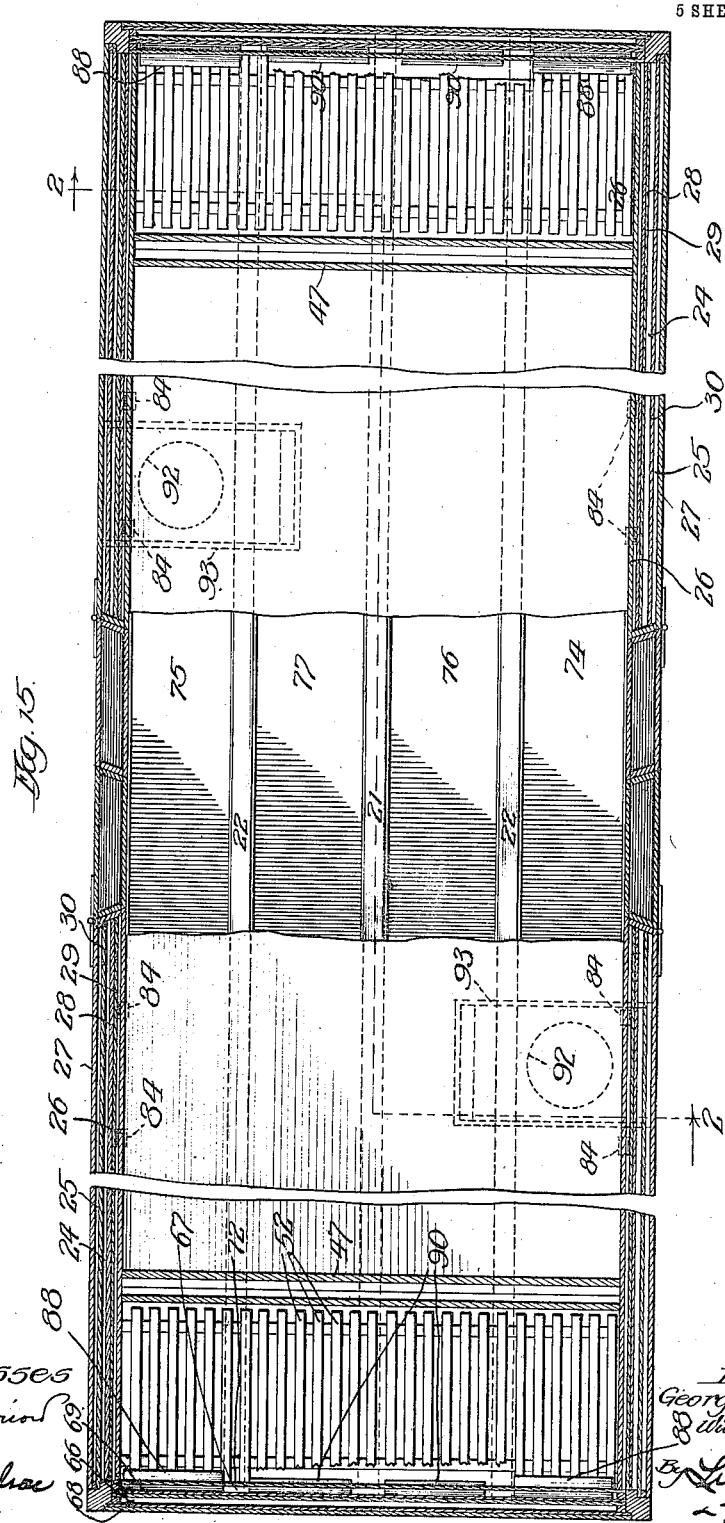

UNITED STATES PATENT OFFICE.

GEORGE B. ROBBINS AND WILLIAM E. SHARP, OF CHICAGO, ILLINOIS.

COMBINATION REFRIGERATOR, HEATER, AND VENTILATOR CAR.

1,013,517.  Specification of Letters Patent.  Patented Jan. 2, 1912.

Application filed July 31, 1909. Serial No. 510,570.

*To all whom it may concern:*

Be it known that we, GEORGE B. ROBBINS and WILLIAM E. SHARP, citizens of the United States, both residing at Chicago, in the county of Cook and State of Illinois, have jointly invented certain new and useful Improvements in Combination Refrigerator, Heater, and Ventilator Cars, of which the following is a specification.

Our invention pertains to improvements in railway cars, one main object and feature being the construction of a car of the refrigerator type, which in winter may be heated sufficiently to prevent injury to the lading in freezing weather, and which if occasion demands may be used as a ventilator car. Succinctly stated, then, a car embodying our invention may be used in all kinds of weather and temperature, and at the same time properly preserve the lading in good condition.

Many features of novelty and improvement will be made apparent by the following detailed description or a desirable embodiment of the invention, which should be read in connection with the accompanying drawings illustrating a car built in accordance with our improved plan and ideas.

In these drawings, throughout the various views of which like reference characters refer to the same parts,—Figure 1 is a fragmentary, longitudinal vertical section of a refrigerator-car body embodying our invention; Fig. 2 is a cross-section through the car body on line 2—2 of Fig. 15, the two halves thereof being in different planes; Fig. 3 is an enlarged cross-section through a portion of the floor and one side wall of the car body; Fig. 4 is a cross-section on an enlarged scale, through one of the side walls and a portion of the roof; Fig. 5 is a longitudinal vertical section through the roof above one of the ice bunkers; Fig. 6 is an enlarged vertical section through the roof near the central part of the car; Fig. 7 is an enlarged vertical section through the floor and one of the end walls beneath one of the ice bunkers; Fig. 8 is a top plan view of the heater box; Fig. 9 is a vertical longitudinal section through the same; Fig. 10 is a partial elevation and partial section on line 10—10 of Fig. 8; Fig. 11 is a cross section of the closure or plug used to replace the heater; Fig. 12 is a plan view of such plug or closure; Fig. 13 is a vertical section through one of the upright flues or passages, showing the application of a hood or cover for its mouth; Fig. 14 is a fragmentary face view of the construction shown in Fig. 13; Fig. 15 is a fragmentary horizontal section through the car-body.

By reference to the drawings, and particularly to Fig. 2, it will be observed that the car body has a pair of wooden side sills 20, 20, a center sill 21, and a pair of intermediate sills 22, 22. It will be also apparent, and particularly from a consideration of Fig. 3, that each side of the car is built up so as to provide three parallel dead-air spaces 23, 24 and 25 between the inner and outer wooden sheathings 26 and 27, each side wall having an intermediate wooden partition 28, the inner face or surface of which is covered with a layer 29 of hair felt, a second layer 30 of which is employed between and spaced apart from the partition 28 and outer sheathing 27. As is shown in Fig. 2, suitable longitudinal spacing strips 31 are employed between these different parts or thin walls of which the whole side wall is composed.

The sloping roof of the car comprises an inner wooden partition or wall 32 faced on top with an asphalt roofing compound or paper 33, a dead-air chamber being employed above the same and between a similar thin body 34 on the bottom of the matching boards 35, between which and the exterior roofing 36 we interpose a coating or layer of hydrex 37, which is an asphalt compound poured on while boiling hot and permitted to cool, so that the roof is hermetically sealed and constitutes an air-tight wall with an intermediate dead-air space 38. The ceiling or horizontal top wall of the car body is built up of the two wooden partitions 39 and 40, with an insulating air compartment 41 between them. The bottom partition 40 is covered with a coating 42 of the above-mentioned hydrex, and on top of the latter a layer of hair felt 43 is superposed, a similar layer 44 being placed on top of the upper partition 39.

Referring once again to the sloping roof of the car, it will be noted that the asphalt roofing 33 lies directly on the board partition 32, while smaller strips 45 of the same material are used to cover the spacing or separating strips 46, as is clearly indicated in the various figures. The exact construction of this roof is not material so long as it is provided with one or more dead-air chambers or other insulating means and is supplied with the asphalt or similar compound 37 to render the roof air-tight.

At each end of the car body we provide a hollow transverse partition 47, which forms with the end portions of the car the two ice boxes or bunkers 48 in communication with that portion of the car body adapted to receive and accommodate the lading by means of the upper and lower passages 49 and 50 above and below the partitions 47, and preferably supplied with gratings or wire nettings 51. The ice is ordinarily supported at the bottom of each bunker on cross bars or grates 52 resting on I beams 53, the latter being supported on suitable malleable iron stools or posts 54. In case only a small quantity of ice is to be employed, the bars or grates 52 may be placed on the upper angle supports 55, forming a smaller ice compartment, as may occasionally be required or deemed advisable. At the bottom of each ice bunker a drip pan 56, desirably of galvanized iron, is provided on the floor of the car, such pan having a water-seal trap 56$^a$ through which the water from the melting ice escapes through the pipe 57 to the outside of the car. Above each ice box or bunker, the roof of the car is equipped with a door 58 hinged along its inner edge at 59, and supplied with a suitable clamp 60 at its other edge to securely hold the door in closed position. The tapered passage 61 through the roof of the car to the ice bunker, and through which the ice may be introduced, is ordinarily closed by removable plug or closure 62 having the dead-air chambers or spaces 63 and 64, and supplied at 65 with a layer of the hydrex asphalt compound above mentioned, this closure and door hermetically sealing this portion of the car roof.

Each end wall of the car body is constructed much like the side walls except that only two heat-insulating outer and inner dead-air spaces 66 and 67 are provided in the same, the outer and intermediate wooden walls 68 and 69 being covered on their inner faces with hair felt or similar coatings 70 and 71, the inner wall 72 having in the present instance no such covering.

The bottom wall of the car body is composed of the double flooring 72$^a$ and 73$^a$, beneath the latter of which and between the above-mentioned sills are the two substantially-horizontal hot-air flues 74 and 75 and the two cold-air passages 76 and 77, all of such flues and passages being disposed lengthwise the car between different pairs of sills and extending from one end of the car body to the other. The bottom of each of these flues or passages is composed of a wooden partition or wall 78 covered on its top surface with a layer of hair felt or other similar material 79. Beneath each partition 78, we provide a dead-air chamber 80, the bottom wall of which is composed of a wooden partition 81 covered with a coating of the above-mentioned hydrex 82, the latter being faced with a layer of felt 83. It will therefore be apparent that the bottom wall or floor of such car body has the flues and passages therein suitably insulated from the outside air, and is also air-tight because of the hydrex or asphalt compound referred to. Along the sides of the car, the hot-air flues 74 and 75 are connected at intervals with the air spaces or chambers 23 in the side walls by means of the elbow or angle pipes or conduits 84, one of which is clearly shown in Fig. 3, these connections permitting a certain amount of the hot air of such flues to pass into the side walls up to the first longitudinal spacing strips 31, so that in cold weather the lower portions of these side walls may be supplied with a limited amount of heat to prevent the lading from being injured by the lower temperature of the outside air.

At the ends of the car beneath the ice boxes or bunkers, the wooden partitions 78 are omitted, and the dead-air chambers 80 are considerably reduced in depth beneath the drip pans 56, while the hot-air flues 74 are correspondingly increased in depth and area of cross section at 85, for the accommodation of such pans. At each end of the car, each of the hot-air ducts 74 and 75 is connected by an elbow or angle conduit 86 with a metal upright duct 87, the top end of which is bent inwardly at 88 and is in communication with the interior of the ice bunker or box, in the present instance substantially half-way up the height of the car, as is clearly indicated in Fig. 1, the mouth of the duct being covered with a grating or the like 89, shown clearly in Fig. 2. Each of the cold-air passages 76 and 77 connects at each end with the bottoms of upward ducts 89' opening into both of the ice bunkers or refrigerator compartments at 90 some distance below and at one side of the mouth 88 of the corresponding air duct, such cold-air passages being similarly equipped with gratings 91 covering their mouths. It should therefore be apparent that both of the two hot-air ducts communicate with the two ice bunkers, the cold-air passages being in corresponding communication with the same compartments.

Each of the hot-air flues 74 and 75 has heated air furnished and admitted thereto near the middle of the car by one of a pair of heaters 92, which may be a kerosene or alcohol stove or the like, contained in a heater compartment or chamber 93 detachably mounted on the outer and intermediate sills 20 and 22 by suitable U-shaped metal strips 94 (Figs. 8, 9 and 10), the upper outturned ends 95 of which may be bolted or otherwise removably fastened to the bottom surfaces of the wooden sills. Each of these heater chambers, as is shown, by communicating with its hot air and return flues intermediate their ends in effect divides each of such flues into ducts or conduits of unequal length extending in opposite directions from the heater chamber. Each of these heater chambers or compartments has wooden walls 96, lined for the purposes of fire protection with sheet-metal 97. The outer end of each heater compartment has a door 98 hinged at its top at 99 and provided with a window 100 for observation of the operation of the heater, and with an outer air inlet opening 101, which may be opened and closed or regulated by an adjustable sliding damper 102.

As is illustrated, particularly in Fig. 1, the hot air arising from each lamp or heater 92 is conducted to its hot-air flue and travels longitudinally from the heater in both directions toward the two ends of the car body, from whence it passes into the two upright ducts 87 into the two ice bunkers and from the latter through passages or openings 49 into the main or lading-carrying portion of the car body. These ducts act somewhat as chimneys causing drafts to suck or draw the air through the horizontal air flues in the car floor. These vertical ducts therefore assist materially in securing the proper flow and rotation of the heated air, being supplemented and assisted in this action by the ice bunkers which under these circumstances act as complementary or extension ducts of larger cross-section operating to convey the heated air to the top of the car from which it descends through the lading as it becomes cooled. It is to be understood that the pair of heaters and their housing compartments or casings are secured beneath the car and on opposite sides thereof, the heat from each lamp delivering hot air to both ice boxes.

As is clearly shown in Fig. 9, one of a pair of cold-air ducts or passages 103 communicates at its upper end with one of the cold-air passages or flues 76 and 77, such cold air entering that portion of the heater box below the flame of the lamp or stove by reason of the hollow partition 104, one side of which forms part of the duct or passage 103, this partition or division wall projecting downwardly below the flame of the lamp, as is clearly shown. As is indicated each cold air passage is associated with its heater in the same manner.

When the car is to be used as a ventilator or refrigerator car during the warmer months of the year, the heater boxes and their stoves are taken off and replaced by plugs or closures 105 built up of a layer of boards 106 having on their top face a compartment or box portion 107 filled with any suitable insulating material 108, such as felt or the like. These plugs or closures are held in position by means of bolts passing through the apertured ends of straps 109, which extend beneath the layer of boards 105, the latter being held in proper engagement by metal strips or bands 110. As we have indicated in Fig. 11, a portion of the plug fits within the opening between the sills 20 and 22 above the heaters when the latter are applied to the cars. When these heaters are not employed, the top inwardly-protruding ends of the ducts 87 and 89' are covered with detachable caps or hoods 111, which may be held in place if necessary by screws 112. As a sort of vent to relieve any excess air pressure in the car caused by the continued entrance of heated air, each cold air passage is supplied with an opening 113, through the car bottom to the outer air, such vent having a controlling sliding door or cover 114.

The operation of a car of this character is substantially as follows: Assuming that the car is to be employed in cold winter weather, no ice would, of course, be used in the bunkers or boxes 48, the caps or hoods 111 would be removed, and the heaters and their boxes or casings would be applied to the car, as has been explained above. The cold air drawn from the interior of the car-body through the passage 50 and duct 89' to the tube 103 by the suction action of the lamp is conducted into the heater compartment below the flame of the lamp, a suitable amount of fresh outer air being also admitted to the heater casing through the opening 101. As will be readily understood the outer air normally drawn into the cold air passages through vents 113, and into the heater compartments through openings 101, supplies the necessary amount of oxygen to properly carry on the combustion and compensate for any loss of air escaping through the walls of the car body. All of these supplies of air are heated by the lamp or stove, such air passing upwardly into the hot-air flue 74 or 75, as the case may be, the air traveling along the floor of the car in both directions and heating the lading, dissipation or radiation outwardly of the heat of such air in the flue being prevented by the bottom dead-air space 80. Also the lower parts of the side walls of the car have hot air admitted thereto through the elbow tubes or conduits 84. As will be readily understood, the heated air which passes through the upright flues 87 of the two ice bunkers discharges into the latter at any desired height, depending upon the lengths of the ducts, as shown in Fig. 1, such hot air traveling still farther upwardly and out into the main body of the car through the openings 49. Upon cooling, this hot air settles and is returned or drawn to the heater compartments by the action of the lamps through the lower portions of the ice boxes, and passages 50 as has been indicated above.

When this combination car is to be used for refrigerating purposes, the heaters and their boxes are taken off and the pair of plugs 105 put in position, the mouths or ends of the flues 87 and 89' being capped by the detachable hoods or closures 111. The ice boxes having been charged with ice, the car as a whole acts in the ordinary manner as a refrigerator for the preservation of the lading. The heated air from the car-body contents entering the ice bunkers through the passages 49 and having been cooled by the ice, such air is again admitted to the lading-carrying portion of the car-body through the openings or lower passages 50. The rotation and circulation of the air in such instance is the reverse of that indicated when the car is employed in cold weather with the heaters in position and operation.

In case it is desired to employ the ventilating features of the car, the plugs or closures 62 are removed and the two hinged doors at the ends of the car are opened to the extent of approximately thirty degrees, as is indicated in Fig. 1. Such open door at the front end of the car, that is, at the end in the direction which the car is traveling, catches the outer air and directs it downwardly into the ice bunker, from which it escapes through the openings 49 and 50 into the main portion of the car, cooling and ventilating the contents thereof, such air at the rear end of the car passing through the openings 49 and 50 into the ice bunker and out of the top of the latter through its open door. In this way an effective and efficient circulation of air is maintained through the car.

We direct especial attention to the fact that our improved car may be used in at least three different ways to meet all the requirements of varying weathers and temperatures and the different kinds of lading which it may be desired to transport. It is furthermore to be noted that since the floor and top of the car body are hermetically sealed, there is but little escape of the heated or cooled air, so that a maximum efficiency is secured whether the car is being heated or cooled. Attention is also directed to the fact that the hot-air flues in the bottom of the car are substantially horizontal, and owing to the slow travel of the air therethrough, the latter is able to give up a considerable portion of its heat to the bottom of the lading, where it is most needed, and where it can do the most effective work in preventing freezing of the contents of the car. Those skilled in the art will readily understand that some of the main and leading features of the present invention are; first, the construction of a car which may be used as a ventilator car, a refrigerator, or as a car sufficiently heated to prevent damage to the lading by cold outer air; second, the hermetically sealing of the top and bottom walls of the car body; third, the provision of means to secure an efficient rotation or movement of the air whether the latter is used for heating or cooling purposes; fourth, the employment of the air passages in the car floor without cutting or weakening the sills; fifth, the provision of a plurality of heaters, the use and object of which is not primarily to heat the car but merely to prevent the temperature thereof from descending to the freezing point; sixth, the use of baffles or partitions whereby the delivery of the cool air from the car-body to the lamps takes place below the flames thereof; seventh, the admission of sufficient outer air to carry on the combustion; and eighth, the use of a vent in the cold air side of the passages and ducts used to create the circulation to care for or relieve any excess air pressure.

Although our improved car is of simple and economical construction, it meets a requirement which is keenly felt for a car which can be used for all kinds of loads and ladings, it being obviously not feasible to divide the cars by particular structural features into summer and winter cars, which could be used only during certain limited portions of the year. The various parts and structural characteristics of the car herein set forth do not interfere with one another in any way so as to modify or detrimentally affect the action of the car, whether it is being used with the heater in operation or as a refrigerator or ventilator car.

Although we have indicated with some degree of particularity the structural features of the walls of the car shown and described, it is to be understood that these, as well as the other parts of the car construction involved directly in this invention may be modified within wide limits without the sacrifice of any of the advantages and benefits of the invention, and without departure from its real substance and essence.

We have stated that the heater may be an oil lamp and we have described means for supplying air to such lamp to support combustion; but we prefer to employ an alcohol burner for the reason, among others, that in transporting certain commodities in a heated car the use of kerosene as a fuel agent is objectionable. Furthermore, when alcohol is used as a fuel the necessary oxygen to support combustion may be supplied from the air of circulation, and the intakes for external air may be omitted or closed, the apparatus working as a closed circulating system. It will be further understood that the removal of the heaters is purely optional since the refrigeration may proceed without the removal of the heaters by closing the supply conduits or even without closing said conduits if the heaters be inclosed.

We claim:

1. A refrigerator car having the usual ice bunker or refrigerant compartment across the end thereof, said compartment having at its upper and lower portions respectively openings communicating with the load space, a heater located below the body of the car, a casing inclosing the heater and constituting a heater chamber, a conduit located below the level of the ice compartment leading from said heater chamber and communicating with said ice compartment between the openings thereof, and a return conduit located below the floor of the car and communicating with said compartment near the floor level and below the said openings and with the lower portion of the heater chamber, whereby a refrigerating medium may be circulated through the ice compartment and load space, or a heating agent may be generated and circulated through said heater chamber, conduits, compartment and load space, substantially as described.

2. A car having insulated walls and the usual ice bunkers or refrigerant compartments across the ends thereof, said compartments having openings in the bulk heads or partition walls thereof above and below the ice space and communicating with the load space, a heater located below the body of the car and adapted to burn alcohol, a casing inclosing the heater and constituting a substantially-closed heater chamber, a conduit leading from the heater chamber to one of said compartments and communicating therewith between the openings thereof which lead into the load space, and a return conduit leading from said compartment below the lower opening thereof back to the lower portion of the heater chamber, whereby a refrigerating current may be circulated through the ice compartments and the load space, and a closed heating circuit is provided through the heater chamber, conduits, one of the compartments, and the load space, substantially as described.

3. A convertible car adapted for use either as a refrigerator car or a heated car, comprising in its construction the combination of a car-body with insulated walls, and an ice bunker or refrigerant compartment in each end of the car-body having ice supports and openings in the upper and lower portions of the bulk head or partition wall thereof communicating with the load space, a heater chamber beneath the car body, a heater in said chamber, ducts or conduits leading from the heater chamber below the floor of the car and communicating with each of said compartments between the openings thereof, and return ducts or conduits leading from said compartments below the lower openings thereof to the lower portion of the heater chamber, whereby a current of cold air may be caused to circulate through the compartments and load space when the car is used as a refrigerator, and a heating current composed of the products of combustion and the air withdrawn from the car may be caused to circulate through the heater chamber, conduits, compartments and load space when the car is used as a heated car, substantially as described.

4. A car having a compartment extending across each end thereof, the bulk-heads or partitions of said compartments having upper and lower openings communicating with the load space, heaters located respectively on opposite sides of the midlength of the car and below the floor, casings inclosing said heaters and constituting heater chambers, supply ducts or conduits leading from each of said heater chambers and communicating with the respective compartments above the floor level, and return ducts or conduits leading from the respective compartments below the lower openings thereof to each of said heater chambers at the lower portion thereof, said compartments serving as a part of the circulating conduit and also as equalizing and distributing chambers for the heated current, substantially as described.

GEORGE B. ROBBINS.
WILLIAM E. SHARP.

Witnesses:
WALTER M. FULLER,
M. A. KIDDIE.